US010148763B2

(12) United States Patent
Eason et al.

(10) Patent No.: US 10,148,763 B2
(45) Date of Patent: Dec. 4, 2018

(54) ESTABLISH CLIENT-HOST CONNECTION

(75) Inventors: Patrick C Eason, Houston, TX (US);
Thomas R Gawlik, Houston, TX (US);
Keith P Calsyn, Houston, TX (US);
Thomas J Flynn, Magnolia, TX (US);
Charles N Shaver, Cypress, TX (US);
Kent E Biggs, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 933 days.

(21) Appl. No.: 14/350,747

(22) PCT Filed: Oct. 10, 2011

(86) PCT No.: PCT/US2011/055625
§ 371 (c)(1),
(2), (4) Date: Apr. 9, 2014

(87) PCT Pub. No.: WO2013/055314
PCT Pub. Date: Apr. 18, 2013

(65) Prior Publication Data
US 2014/0297880 A1 Oct. 2, 2014

(51) Int. Cl.
G06F 13/00 (2006.01)
G06F 15/00 (2006.01)
G06F 15/173 (2006.01)
G06F 21/00 (2013.01)
H04L 12/00 (2006.01)
H04L 29/02 (2006.01)
H04Q 11/00 (2006.01)
(Continued)

(52) U.S. Cl.
CPC .............. *H04L 67/141* (2013.01); *G06F 3/14* (2013.01); *G09G 2370/022* (2013.01)

(58) Field of Classification Search
CPC ........ H04L 29/06; H04L 63/083; H04L 67/10; H04L 67/14; H04L 67/04; G06F 17/3056
See application file for complete search history.

(56) References Cited

U.S. PATENT DOCUMENTS 5,623,261 A * 4/1997 Rose ....................... G06F 3/023
341/20
6,349,337 B1 2/2002 Parsons et al.
7,457,878 B1 11/2008 Mathiske et al.
(Continued)

FOREIGN PATENT DOCUMENTS

CN 1448861 A 10/2003
CN 1783052 A 6/2006
(Continued)

OTHER PUBLICATIONS

EP Search Report (partial) ~ Application No. 11873961.4-1904/2766815 dated May 11, 2015 ~ 7 pages.
(Continued)

*Primary Examiner* — Nicholas R Taylor
*Assistant Examiner* — Ho T Shiu
(74) *Attorney, Agent, or Firm* — Fabian VanCott

(57) ABSTRACT

Example embodiments disclosed herein relate to establishing a connection over a network between a first host device and a client device. The client device transmits client information over the network related to the first host device. Display information is transmitted by the first host device to be output by the client device.

14 Claims, 8 Drawing Sheets

(51) Int. Cl.
*H04L 29/08* (2006.01)
*G06F 3/14* (2006.01)

(56) References Cited

U.S. PATENT DOCUMENTS

| | | | |
|---|---|---|---|
| 7,594,020 | B2 | 9/2009 | Apreutesei |
| 8,386,260 | B2 | 2/2013 | Engelsma et al. |
| 2002/0049916 | A1* | 4/2002 | Nozaki ............... G06F 21/33 726/28 |
| 2003/0041147 | A1 | 2/2003 | Van Den Oord et al. |
| 2003/0115296 | A1* | 6/2003 | Jantz ................. H04L 29/06 709/220 |
| 2004/0043818 | A1 | 3/2004 | Willis |
| 2005/0193396 | A1 | 9/2005 | Stafford-Fraser et al. |
| 2005/0220039 | A1* | 10/2005 | Hoshino ......... H04L 29/06027 370/261 |
| 2006/0095526 | A1 | 5/2006 | Levergood |
| 2006/0117085 | A1 | 6/2006 | Nagao et al. |
| 2008/0263217 | A1 | 10/2008 | Kimizuka et al. |
| 2010/0082734 | A1 | 4/2010 | Elcock |
| 2010/0192071 | A1 | 7/2010 | Noguchi |
| 2010/0268831 | A1* | 10/2010 | Scott .................... H04W 64/00 709/228 |
| 2010/0306424 | A1* | 12/2010 | Akester ............... G06F 3/023 710/36 |
| 2012/0324076 | A1* | 12/2012 | Zerr .................... H04W 4/206 709/223 |

FOREIGN PATENT DOCUMENTS

| | | |
|---|---|---|
| CN | 101911041 | 12/2010 |
| JP | 2005-284753 | 10/2005 |
| JP | 2006-293935 A | 10/2006 |
| JP | 2007-094610 A | 4/2007 |
| JP | 2007-299136 A | 11/2007 |
| JP | 2008-033448 A | 2/2008 |
| JP | 2008-160803 A | 7/2008 |
| JP | 2008-211639 A | 9/2008 |
| JP | 2011-100178 A | 5/2011 |
| TW | 201007574 A | 2/2010 |
| TW | M379110 U | 4/2010 |
| TW | 201117590 A | 5/2011 |

OTHER PUBLICATIONS

International Searching Authority, Appl. No. PCT/US2011/055625 filed Oct. 10, 2011, Search Report and Written Opinion, 9pp, dated Jul. 12, 2012.

Introducing the $59 Linux Desktop Computer—Userful MultiSeat Released, http://www.userful.com/press/multiseat-linux-2011-released, Dec. 7, 2010.

* cited by examiner

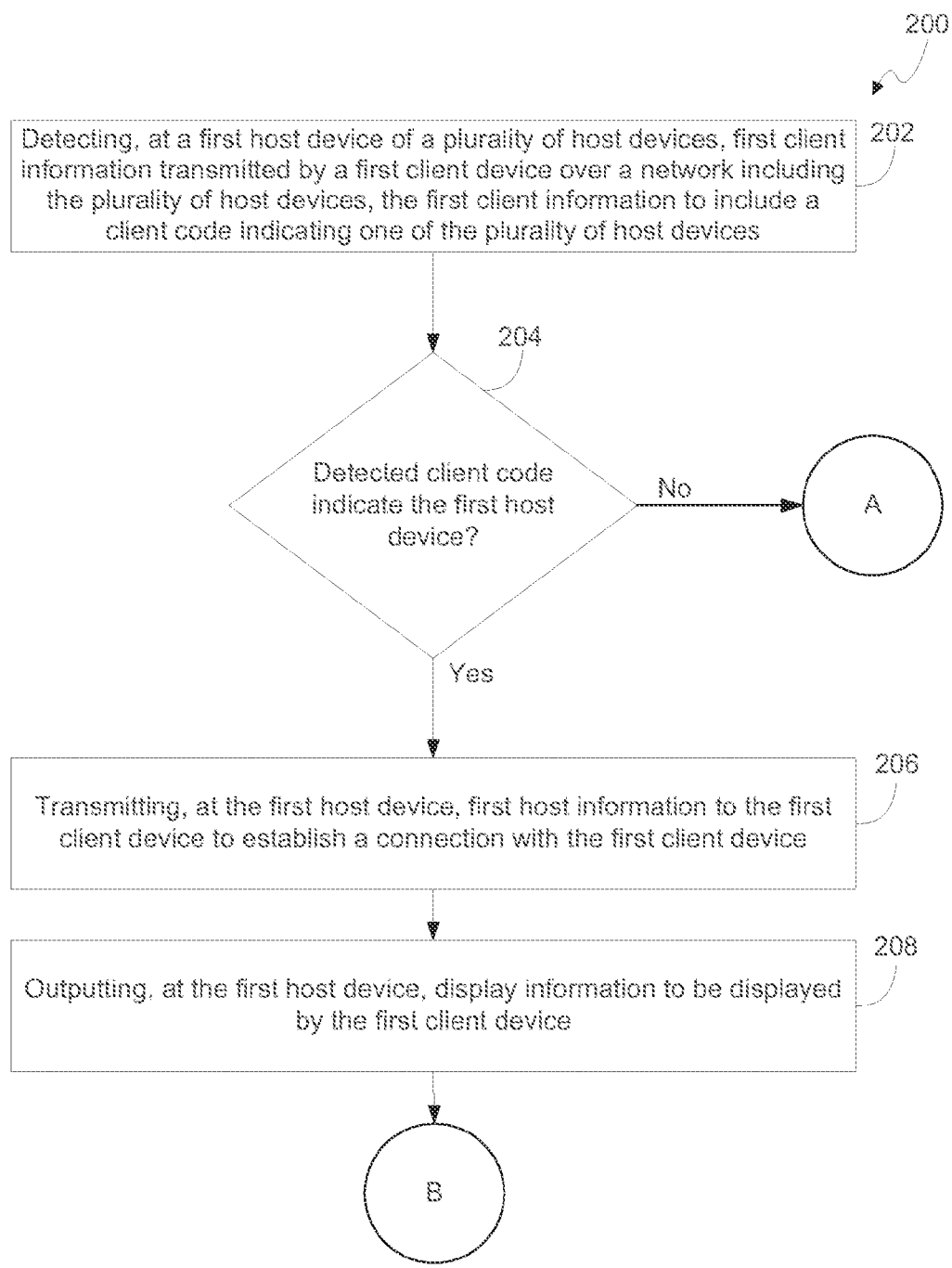

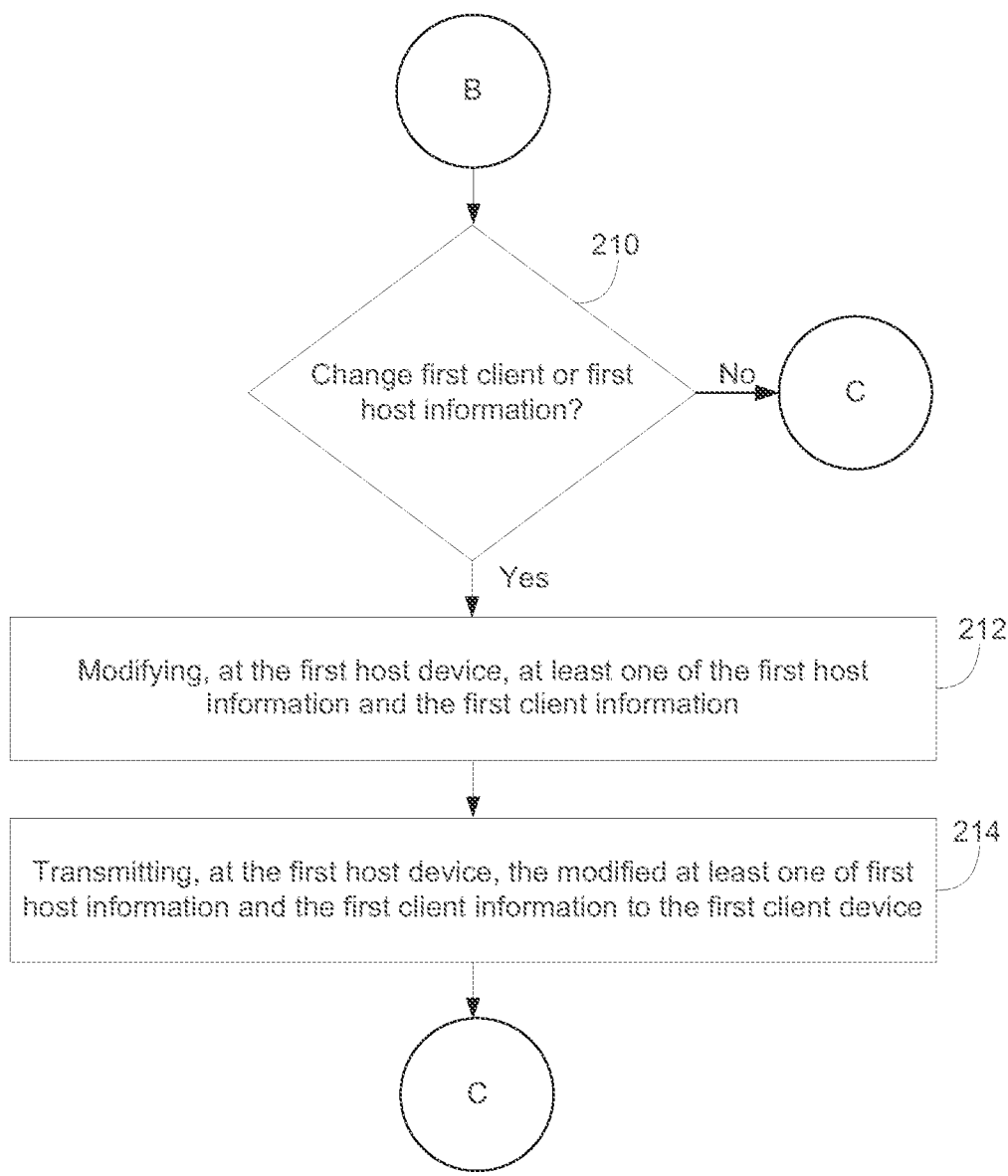

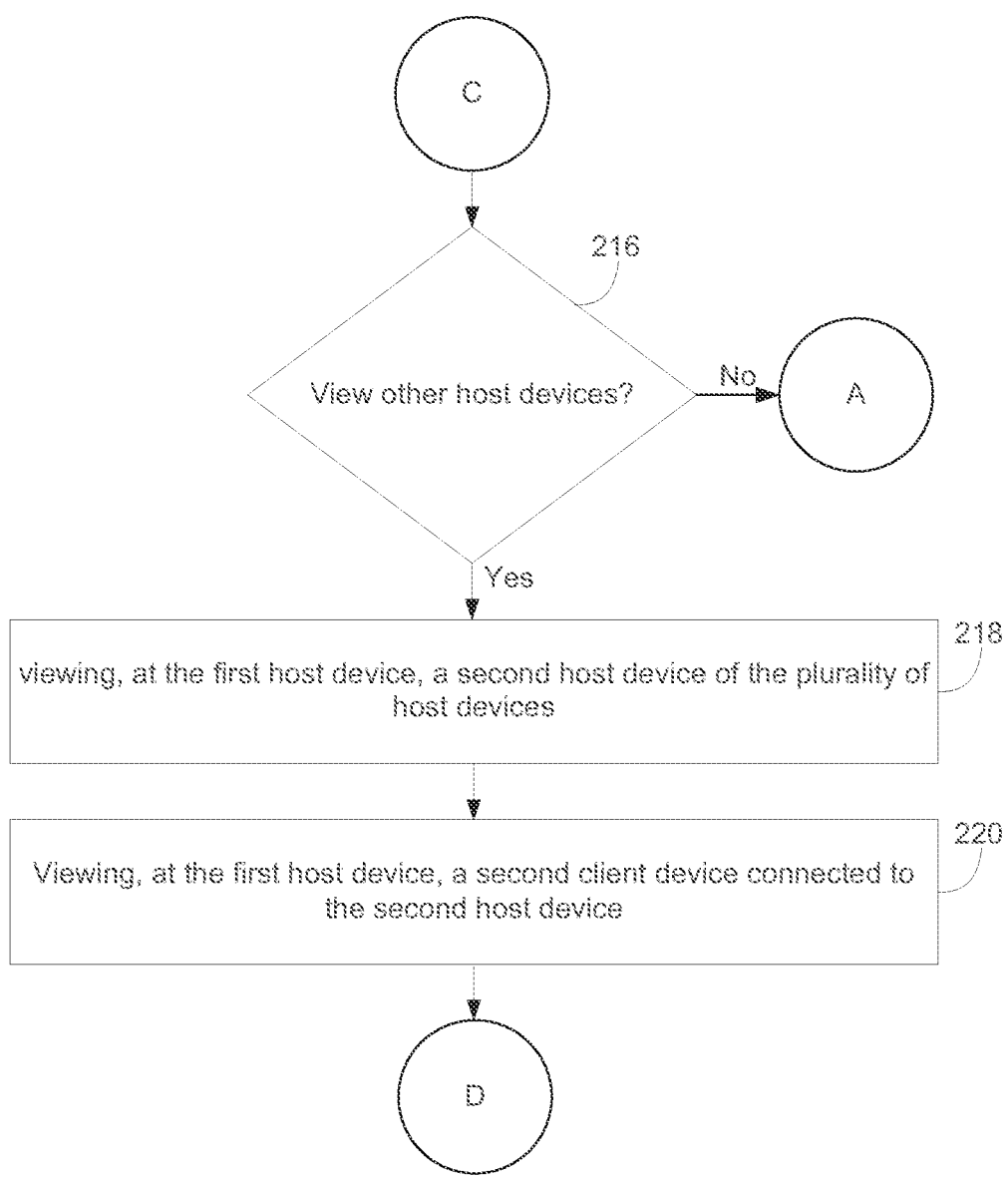

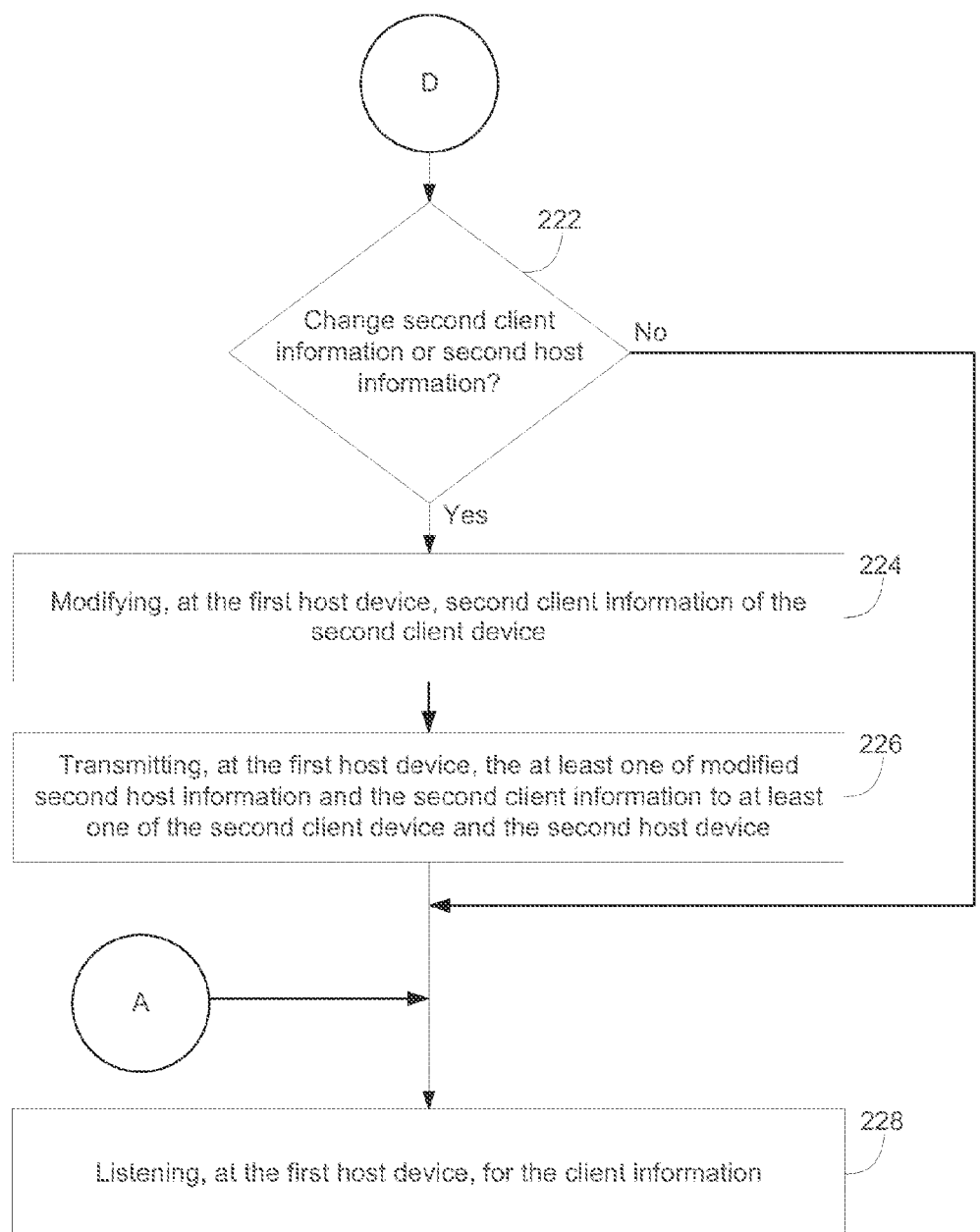

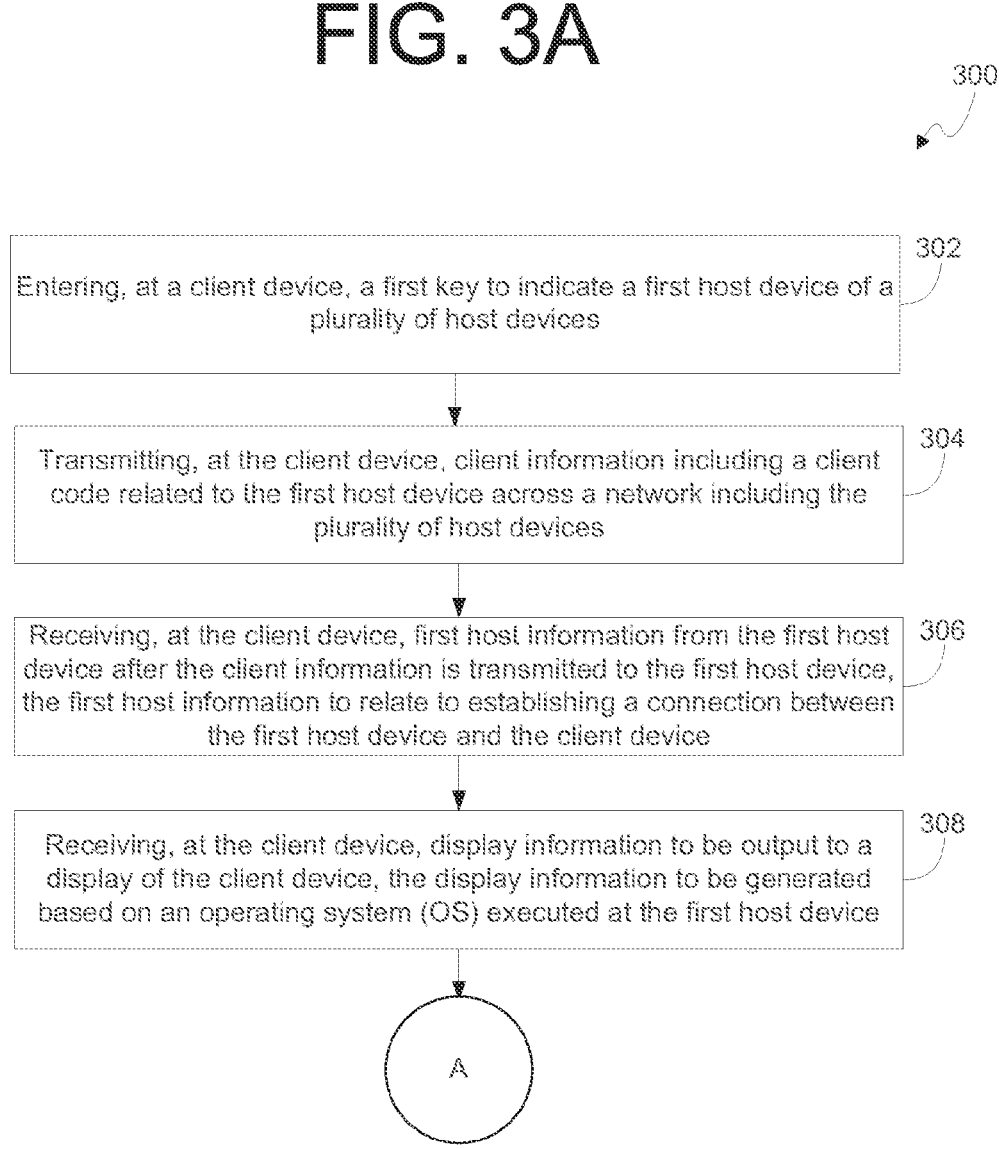

ESTABLISH CLIENT-HOST CONNECTION

BACKGROUND

Some types of client devices, such as zero clients, do not have an operating system (OS) installed or only a small portion of the OS installed. Instead, these client devices connect over a network to a host device, such as a server, which performs all or a majority of functionalities requested by users of the client devices.

Client devices may consume fewer resources, require less space and be lower in cost than traditional computing devices. As network complexity increases, such as in a multi-host environment, establishing a connection between the client device and the host device may become increasingly challenging.

BRIEF DESCRIPTION OF THE DRAWINGS

The following detailed description references the drawings, wherein:

FIGS. 2A-2D are an example flowchart of a method for establishing a client-host connection at a first host device; and FIGS. 3A-3C are an example flowchart of a method for establishing a client-host connection at a client device.

DETAILED DESCRIPTION

Specific details are given in the following description to provide a thorough understanding of embodiments. However, it will be understood by one of ordinary skill in the art that embodiments may be practiced without these specific details. For example, systems may be shown in block diagrams in order not to obscure embodiments in unnecessary detail. In other instances, well-known processes, structures and techniques may be shown without unnecessary detail in order to avoid obscuring embodiments.

A client device, such as a zero client, may not have an operating system (OS) installed or only a small portion of the OS installed. Instead, the client device may connect to a host device, such as a server, which carries out all or a majority of functionalities requested by users using the client device.

Client devices may consume fewer resources, require less space, are lower in cost and/or easier to manage than traditional computing devices, such as a thick client, which includes an OS. However, forming a connection between the thin client and the host device may prove more challenging in a multi-client and/or multi-host environment. The client device may include additional functionality to choose from a plurality of host devices and the host device may seek additional information to distinguish between a plurality of host devices and/or determine a location of the client device.

Significantly increasing functionality at the client device, such as by installing the OS or a larger portion of the OS, may also significantly increase a complexity of the zero client. As such, at the very least, manageability of the zero client will become more cumbersome. For example, the OS at each of the client devices may require updates and/or a greater number of hardware components may be installed or replaced for the client devices in the future.

Figure 1:
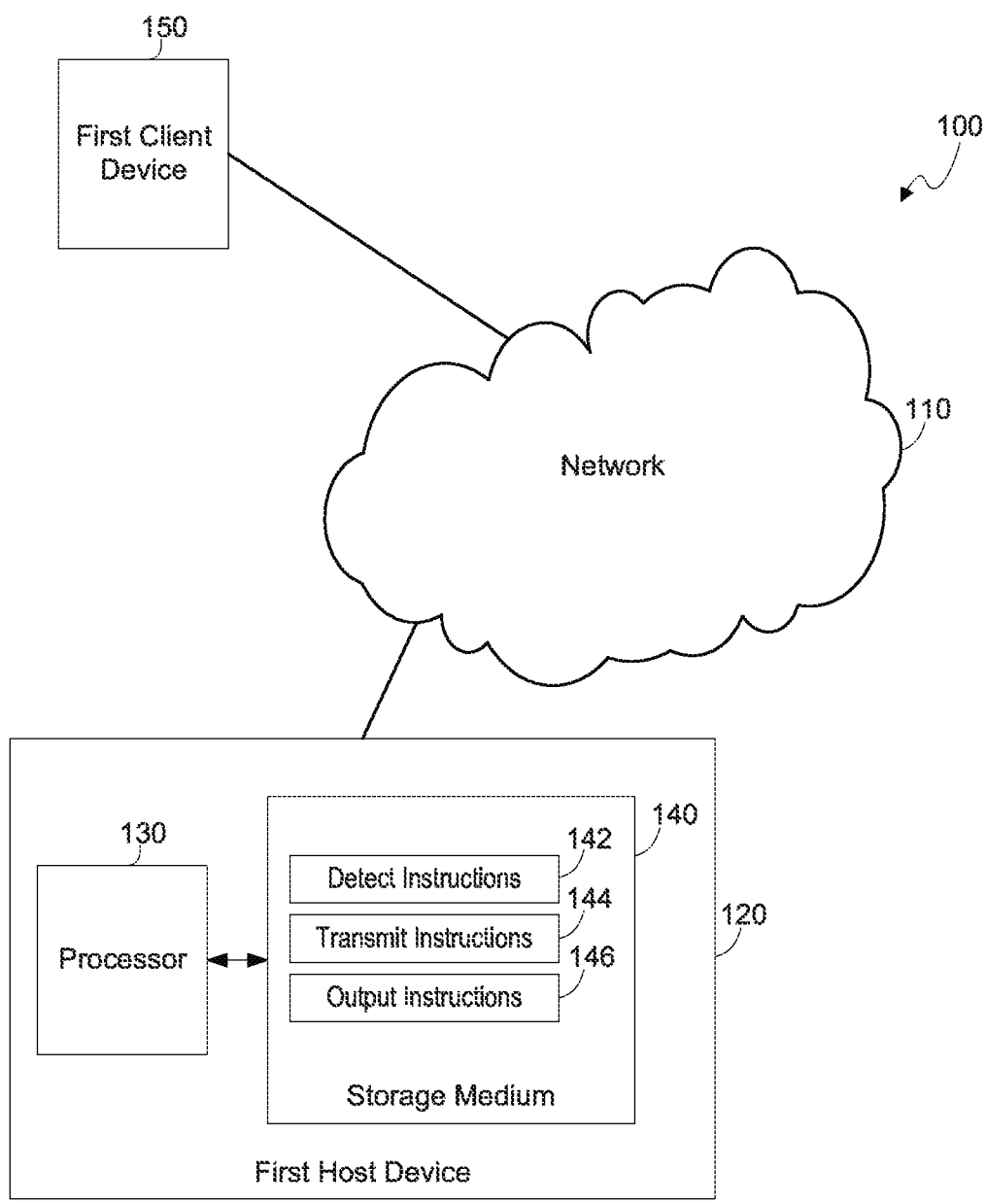
FIG. 1 is an example block diagram of a system including a first host device having instructions for establishing a client-host connection.

Embodiments allow the client device to select from a plurality of host devices without significantly increasing a complexity of the client device. For example, the client device may send out a client code indicating the selected host device without having an OS installed at the client device. Further, embodiments allow information of a host or client device to be modified from a central location, such as one of the host devices. Hence, the client devices may be more easily modified remotely, such as for updating information. Thus, manageability costs may decrease as the client devices may not need to be physically accessed. Moreover, the client devices may remain low in cost, low in power consumption and small in size, allowing for easier removal or replacement of the client devices, Referring now to the drawings, FIG. 1 is an example block diagram of a system 100 including a first host device 120 having instructions for establishing a client-host connection. In the embodiment of FIG. 1. the system 100 includes a network 110, the first host device 120 and a first client device 150.

The network 110 may include one or more interconnected devices, such as network interface cards, repeaters, hubs, bridges, switches, routers, firewalls, and the like. The interconnected devices may share resources or information. While the system 110 is shown to include only a single host device 120 and a single client device 150, embodiments of the system 110 may include a a plurality of client devices capable of connecting to a plurality of host devices. For instance, different host devices may provide different services, resources, and/or serve different types of users via the client devices. The first host device 120 and the first client device 150 may communicate with each other via communications protocols, such as Ethernet or the Internet Protocol Suite, over the network 110.

The first host device 120 and the first client device 150 may be part of a client-server architecture, where a user interacts with the first client device 150 to request a service from the first host device 120. The first client device 150 may be a computing device that relies on a server such as the first host device 120, to fulfill its traditional computational roles. For example, the first client device 150 may not run a full OS. Instead, the first host device 120 may run all or most of the OS and/or process most or all of the first client device's 150 business logic.

Embodiments of the first client device 150 may include, for example, a thin client, an ultra thin client, a zero client and the like. The first client device 150 may include the components necessary to establish a connection with one of the plurality of host devices, such as the first host device 120, and to display an output from the connected host device, such as the first host device 120. For example, the first client device 150 may include a network controller (not shown) to interface with the network 110, a video decoder (not shown) to decode display data output from the first host device 120 and other peripheral equipment, such as a display (not shown), a keyboard (not shown), and memory (not shown).

The first host device 120 includes a processor 130 and a machine-readable storage medium 140 including instructions 142, 144 and 146 for establishing a client-host connection. The first host device 120 may be a computing device running software to provide a resource or service to a service requester or client, such as the first client device 150, or any other device capable of executing the instructions 142, 144 and 146. Examples of the first host device 120 include a database server, file server, mall server, print server, web server, DHCP server and the like.

The processor 130 may be, at least one central processing unit (CPU), at least one semiconductor-based microprocessor, at least one graphics processing unit (GPU), other hardware devices suitable for retrieval and execution of instructions stored in the machine-readable storage medium 140, or combinations thereof. The processor 130 may fetch, decode, and execute Instructions 142, 144 and 146 to implement establishing a client-host connection. As an alternative or in addition to retrieving and executing instructions, the processor 110 may include at least one integrated circuit (IC), other control logic, other electronic circuits, or combinations thereof that include a number of electronic components for performing the functionality of instructions 142, 144 and 146.

The machine-readable storage medium 140 may be any electronic, magnetic, optical, or other physical storage device that contains or stores executable instructions. Thus, the machine-readable storage medium 140 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 140 can be non-transitory. As described in detail below, machine-readable storage medium 140 may be encoded with a series of executable instructions for establishing a client-host connection.

Moreover, the instructions 142, 144 and 146, when executed by a processor (e.g., via one processing element or multiple processing elements of the processor) can cause the processor to perform processes, such as, the process of FIGS. 2A-2D. In operation, the client device 150 may prompt the user to select one of the plurality of host devices after, for example, being powered on from an off state or reset from a previous session. In turn, the user may press a key (e.g. A-B, a-b, 1-0, F1-F12, etc.) of a keyboard (not shown) connected to the first client device 150 and a scancode of the pressed code may be sent from the keyboard to the first client device 150. Scancodes of different keys of the keyboard may correlate to different host devices.

The first client device 150 may transmit first client information including the scancode of the pressed code across the network 110. The scancode included in the client information may be referred to as a client code. The first client information may also include other information of the first client device 150, such as a name, location, an access permission, a device or a status field of the first client device 150. The name included in the client Information may be a term or phrase used to identify the client device.

The location included in the client information may be a label used to indicate where the client device is located with respect to the network 110, such as such as an Internet Protocol (IP) network address or a group. The access permission included in the client information may indicate which fields, such as other data included in the client information, are modifiable and/or accessible, such as via a password. The device field included in the client information may indicate information about the hardware of the client device, such as a computing platform or model number. The status included in the client information may indicate an operation state of the client device, such as on, busy, or off.

One or more of the host devices may be listening for the client information on the network 110. For example, the detect instructions 142 of the first host device 120 may be executed by the processor 130 to detect client information transmitted by the first client device 150 over the network 110 including the plurality of host devices.

The transmit instructions 144 may be executed by the processor 130 to transmit first host information to the first client device 150 to establish a connection with the first client device 150, if the detected client code included in the first client information indicates the first host device 120, The first host device 120 and/or another network device may store the first client information and first client device 150 may store the transmitted first host information.

The first host information may include, for example, a name of the first host device 120. Each of the plurality of host devices may store a different host code, such as a different scancode. The first host device 120 may compare its host code to the client code included in the first client information transmitted by the first client device 150. If the host and client codes match, the first host device 120 may transmit the first host information, which may include, for example, a name of and/or acknowledgement by the first host device 120. Additional information may also be communicated between the first host device 120 and the first client device 150 to establish the connection, such as information related to a Transmission Control Protocol (TCP) connection. The first host device 120 may include a communication component, such as a network interface card, to communicate with the first client device 150.

After the connection is established between the first host device 120 and the first client device 150, the output instructions 142 may be executed by the processor 130 to output display information, such as video data, to the first client device 150. The display information may be generated by an operating system (OS) at the first host device 120. The first client device 150 may not include an OS but may output the display information to a display through a video decoder. Alternatively, the first client device 150 may output raw video data included in the display information.

The machine-readable storage medium 120 may also include Instructions (not shown) to view and/or modify information of other host devices or client devices, as explained below with respect to FIGS. 2A-2D. For example, the first host device 120 may reassign a client device to a different host device or modify client information of a client device. As such, embodiments may allow client devices at remote locations to be managed from a central location. For example, the first host device 120 or another network device, may include an interface, such as a graphical user interface (GUI) as well as instructions to display client information stored at the plurality of host devices and to modify the client information of a second client device connected at least one of the plurality of host devices.

FIGS. 2A-2D are an example flowchart of a method 200 for establishing a client-host connection at a first host device 120. Although execution of method 200 is described below with reference to the first host device 120, other suitable components for execution of the method 200 can be utilized. Additionally, the components for executing the method 200 may be spread among multiple devices (e.g., a processing device in communication with input and output devices). In certain scenarios, multiple devices acting in coordination can be considered a single device to perform the method 200. The method 200 may be implemented in the form of executable instructions stored on a machine-readable storage medium, such as storage medium 140, and/or in the form of electronic circuitry.

As explained above, the first host device 120 may be one of a plurality of host devices connected to the network 110 and the first client device 150 may be one of a plurality of client devices connected to the network 110. Initially, the first host device 120 is listening for client information sent out by a client device. In FIG. 2A, at block 202, the first host device 120, detects first client information transmitted by the first client device 150. The first client information includes a client code indicating one of the plurality of host devices, as explained above in more detail. Then, at block 204, the first host device 120 determines whether the client code included in the first client information indicates the first host device 120. If the client code does not indicate the first host device 120, the first host device 120 continues to listen for other incoming client information, at block 228.

If the client code does indicate the first host device 120, the first host device 120 transmits first host information to the first client device 150 to establish a connection with the first client device 150, at block 206. The first host information is explained in more detail above. Alternatively, in embodiments where there are no client devices other than the first client device 150, the first host device 120 may transmit the first host information without reading the client code and instead attempt to establish a connection with any client device detected.

Once the connection is established, the first host device 120 outputs display information to be displayed by the first client device, at block 208. The display information is generated by an OS at the first host device 120 and the display information is to be output to a display of the first client device 150, as explained above. Examples of the display may include an LCD, CRT, projector, etc.

An administrator may, for example, access the first host device 120, another of the plurality of host devices, or another network device, to modify client or host information of one or more host or client devices from a central location. In FIG. 2B, at block 210, the first host device 120 determines whether there is a request, such as from the administrator, to change the first client Information of the first client device 150 and/or the first host information of the first host device 120. If there is no such request, the method 300 may flow to block 216, as described below. If there is such a request, at block 212, the first host device 120 modifies the first host information and/or the first client information.

For example, modifying the first host information may include changing the name of the first host device 120 to assign the first client device 150 from the first host device 120 to another of the plurality of host devices, in another example, modifying the first client information may include changing the location of the first host device 120 to assign the first client device 150 to at least one of a different group and address. In yet another example, modifying the first client information may include changing the access permission of the first client device 150 to at least one of lock a field of the first client device 150 and modify a password of the first client device 150.

Then, at block 214, the first host device 120 transmits the modified at least one of first host information and the first client information to the first client device 150. Next, in FIG. 2C, at block 216, the first host device 120 determines whether there is a request, such as from the administrator, to view host information of other host devices or client information of the client devices. If there is no such request, the method 200 flows to block 228, where the first host device 120 continues to listen for other incoming client information.

If there is such a request, at block 218, the first host device 120 views second host information of a second host device of the plurality of host devices, the second host information may include a name of the second host. Next, at block 220, the first host device 120 views second client information of a second client device (not shown) of the plurality of host devices connected to the second host device. The second client information may similarly include at least one of a name, location, an access permission, a device and a status of the second client device.

Then, in FIG. 2D, at block 222, the first host device 120 determines whether there is a request, such as from the administrator, to change the second client information of the second client device or the second host information of the second host device. If there is no such request, the method 200 flows to block 228, where the first host device 120 continues to listen for other incoming client information. If there is such a request, at block 224, the first host device 120 modifies at least one of the second host information of the second host and the second client information of the second client device. Next, at block 226, the first host device 120 transmits the at least one of modified second host information and the second client information to at least one of the second client device and the second host device. Lastly, the first host device 120 continues to listen for other incoming client information. Should the first host device 120 detect any client information from a client device, the first host device 120 may again carry out the method 200. While the above method 200 is described with respect to the first host device 120, the method 200 may be carried out with respect to any of the plurality of host devices.

Figure 3B:
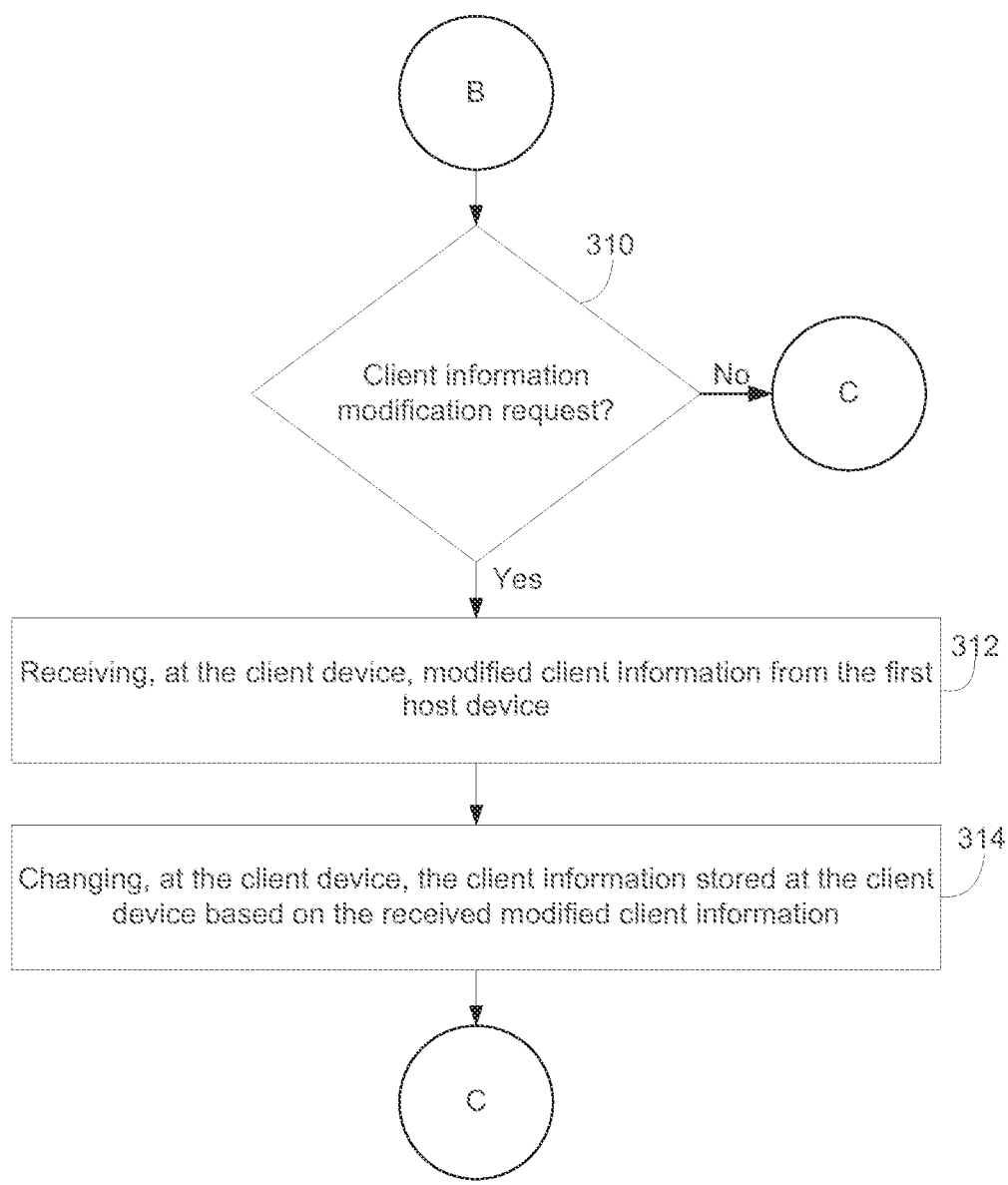
Figure 3C:
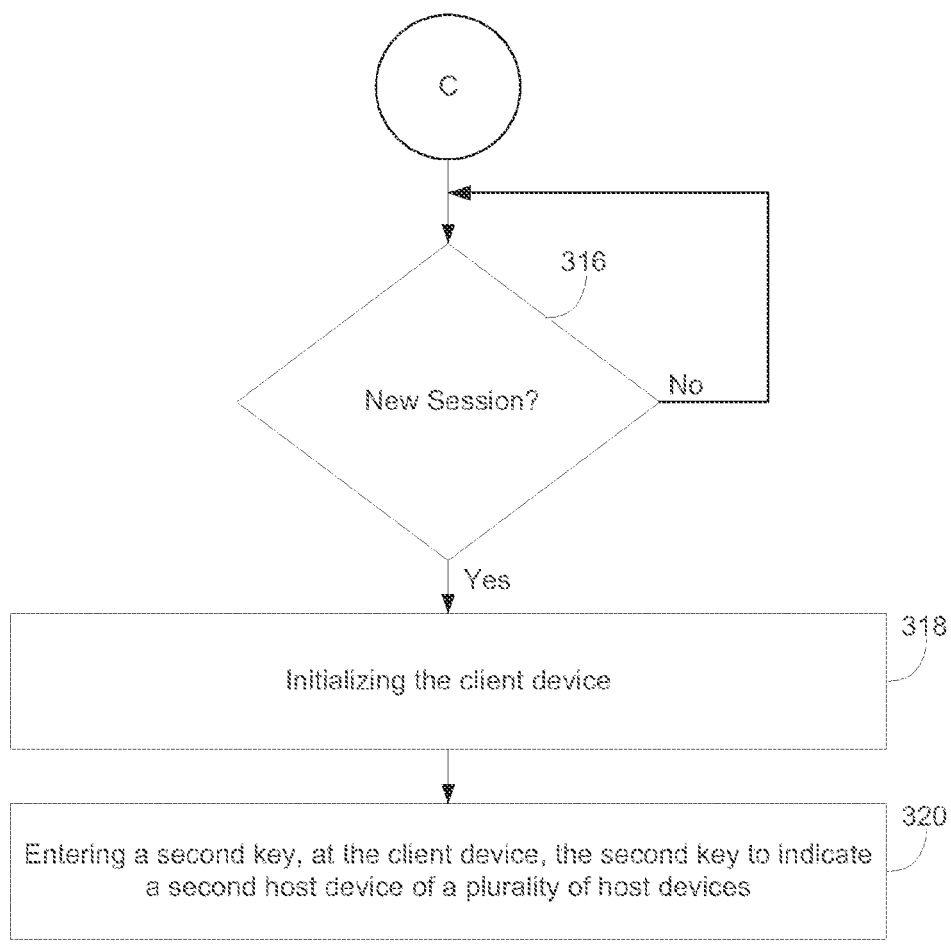

FIGS. 3A-3C are an example flowchart of a method 300 for establishing a client-host connection at a client device. Although execution of method 300 is described below with reference to the first client device 150, other suitable components for execution of the method 200 can be utilized. Additionally, the components for executing the method 300 may be spread among multiple devices (e.g., a processing device in communication with input and output devices). In certain scenarios, multiple devices acting in coordination can be considered a single device to perform the method 300. The method 300 may be implemented in the form of executable instructions stored on a machine-readable storage medium and/or in the form of electronic circuitry.

As explained above, the first client device 150 may be, for example, a zero client. In FIG. 3A, at block 302, a first key is entered at the first client device 150. The first key indicates a first host device 120 of a plurality of host devices. As noted above, the user may press one of the keys of a keyboard to select one of the plurality of host devices.

Then, at block 304, the first client device 150 transmits first client information including a client code related to the first host device 120 across a network 110 including the plurality of host devices. As explained above, the client code may be a scancode of the key pressed by the user. Next, at block 306, the first client device 150 receives first host information from the first host device after the client information is transmitted to the first host device 150. As noted above, the first host information relates to establishing a connection between the first host device 120 and the first client device 150. Afterward, at block 308, the first client device 150 receives display information from the first host device 120, the display information to be output to a display of the first client device 150, the display information to be generated based on an OS executed at the first host device 120. The display information may include, for example, graphical information, a video stream, and the like, to be displayed on the display of the first client device 150.

Next, in FIG. 3B, at block 310, the first client device 150 determines whether a request has been received, such as from the first host device 150, to modify the first client information stored at the first client device 150. If no such request has been received, the method 300 flows to block 312, as explained below. Otherwise, if such a request is received, the first client device 150 receives modified first client information from the first host device 120. Next, at block 314, the first client device 150 changes the first client information stored at the first client device 150 based on the received modified first client information, such as changing a name, location, an access permission, a device and or a status of the first client device 150.

Then, in FIG. 3C, at block 316, the first client device 150 determines whether a new session has been initiated. The new session may be initiated, for example, if the first client device 150 is reset, such as after the user logs off the first client device 150 or the first client device 150 is powered on from an inactive state (e.g. an off state, a hibernate state, a sleep state). Alternatively, the first client device 150 may continue to connect to a previously selected host device until the user selects a different host device. If no new session is initiated, the first client device 150 remains at block 316 and maintains the connection established with the current host device, such as the first host device 120, until the new session is initiated. If the new session is initiated, the first client device 150 is initialized at block 318, which may include, for example, clearing data specific to the previous session and prompting the user to select a new host device. After the first client device 150 is initialized, the user enters a second key at block 320, such as by pressing a second key of the keyboard connected to the first client device 150. The second key indicates a second host device of the plurality of host devices.

With the above approaches, a client device may connect to a host device over a network including a plurality of host devices, without significantly increasing complexity at the client device. For example, the client device may transmit a client code across the network indicating one of the plurality of host devices in response to a user pressing a single key of a keyboard. The transmitted client code may initiate establishment of a connection between the client device and the selected host device. Furthermore, the above operation may be carried out by the client device without installing an OS at the client device. Moreover, one or more of the client devices may be managed from a central location, such as one of the host devices.

What is claimed is:

1. A method for establishing a client-host connection, comprising:
   detecting, at a first host device of a plurality of host devices, first client information transmitted by a first client device over a network including the plurality of host devices, the first client information to include a client code associated with one of the plurality of host devices, the client code comprising a scancode associated with a first key pressed on a keyboard at the first client device wherein different pressable keys correlate to different scancodes associated with different hosts within the plurality of hosts;
   transmitting, at the first host device, first host information to the first client device to establish a connection with the first client device in response to a determination that the detected client code first originating from the first client device and included in the first client information is associated with the first host device, wherein the client code indicates which of the plurality of hosts the first client information is to be sent;
   outputting, at the first host device, display information to be displayed by the first client device; and
   modifying, at the first host device, the first client information of the first client device in response to a request thereof, wherein the modifying the first client information includes changing the access permission of the first client device to lock content of the first client device; and
   transmitting, at the first host device, the modified first client information to the first client device;
   wherein the display information is generated by an operating system (OS) at the first host device and the display information is to be output to a display of the first client device.

2. The method of claim 1, wherein,
   the first client information further includes at least one of a name, location, an access permission, a device and a status field of the first client device, and
   the first host information includes a name of the first host device.

3. The method of claim 2, further comprising:
   modifying, at the first host device, the first host information in response to a request to modify the first client information; and
   transmitting, at the first host device, the modified at least one of first host information and first client information to the first client device.

4. The method of claim 3, wherein the modifying the first host information includes changing the name of the first host device to assign the first client device from the first host device to another of the plurality of host devices.

5. The method of claim 3, wherein the modifying the first client information includes changing the location of the first client device to assign the first client device to at least one of a different network group and address.

6. The method of claim 3, wherein the modifying the first client information includes changing the access permission of the first host client device to at least one of lock content of the first client device and to modify a password of the first client device.

7. The method of claim 1, further comprising:
   viewing, at the first host device, second host information of a second host device of the plurality of host devices, the second host information to include a name of the second host; and
   viewing, at the first host device, second client information of a second client device connected to the second host device, wherein
   the second client information includes at least one of a name, location, an access permission, a device and a status of the second client device.

8. The method of claim 7, further comprising:
   modifying, at the first host device, at least one of second host information and the second client information; and
   transmitting, at the first host device, the at least one of modified second host and second client information to at least one of the second client device and the second host device.

9. A method for establishing a client-host connection, comprising:
   receiving, at a client device, a first pressed key on a keyboard, the first pressed key associated with a first host device of a plurality of host devices wherein different pressable keys correlate to different scancodes associated with different hosts within the plurality of hosts;
   transmitting, originally at the client device, client information including a client code related to the first host device across a network including the plurality of host devices, the client code comprising the scancode associated with the first pressed key, wherein the client code indicates which of the plurality of hosts the first client information is to be sent;

receiving, at the client device, first host information from the first host device, the first host information to relate to establishing a connection between the first host device and the client device in response to a determination that the detected client code first originating from the client device is associated with the first host device;

receiving, at the client device, display information to be output on a display of the client device, the display information to be generated based on an operating system (OS) executed at the first host device;

modifying, at the first host device, the client information of the client device in response to a request thereof, wherein the modifying the client information includes changing the access permission of the client device to lock content of the client device; and transmitting, at the first host device, the modified client information to the client device.

10. The method of claim 9, further comprising:

receiving a second pressed key, at the client device, the second pressed key to indicate a second host device of a plurality of host devices; and initializing the client device before entering at least one of the first and second pressed keys.

11. The method of claim 10, wherein, the entering the first pressed key includes a user pressing a first key of a keyboard of the client device, and the entering the second pressed key includes the user pressing a second key of a keyboard of the client device.

12. The method of claim 9, further comprising, receiving, at the client device, modified client information from the first host device and changing, at the client device, the client information stored at the client device based on the received modified client information, wherein the client information further includes at least one of a name, location, an access permission, a device and a status of the client device.

13. A non-transitory computer-readable storage medium storing instructions that, when executed by a processor of a first host device of a plurality of host devices, cause the processor to:

detect client information transmitted by a first client device over a network including the plurality of host devices, the client information to include a client code associated with one of the plurality of host devices, the client code comprising a scancode associated with a first key pressed on a keyboard at the first client device wherein different pressable keys correlate to different scancodes associated with different hosts within the plurality of hosts and wherein the client code indicates which of the plurality of hosts the first client information is to be sent;

transmit first host information to the first client device to establish a connection with the first client device, in response to the determination that the detected client code first originating from the first client device and included in the client information is associated with the first host device; and output, at the first host device, display information to be displayed by the first client device, the display information generated by an operating system (OS) at the first host device;

modify, at the first host device, the client information of the first client device in response to a request thereof, wherein the modifying the client information includes changing the access permission of the first client device lock content of the first client device; and transmit, at the first host device, the modified client information to the first client device.

14. The non-transitory computer-readable storage medium of claim 13, further comprising instructions that, when executed by the processor, cause the processor to:

display client information of the plurality of host devices; and modify the client information of a second client device connected at least one of the plurality of host devices, wherein the client information further includes at least one of a name, location, an access permission, a device and a status of the second client device.

* * * * *

UNITED STATES PATENT AND TRADEMARK OFFICE
CERTIFICATE OF CORRECTION

PATENT NO. : 10,148,763 B2  
APPLICATION NO. : 14/350747  
DATED : December 4, 2018  
INVENTOR(S) : Patrick C Eason et al.

Page 1 of 1

It is certified that error appears in the above-identified patent and that said Letters Patent is hereby corrected as shown below:

In the Claims

In Column 8, Line 35, in Claim 6, after "first" delete "host".

In Column 9, Line 37, in Claim 12, after "device" insert -- ; --.

Signed and Sealed this
Twenty-sixth Day of March, 2019

Andrei Iancu
*Director of the United States Patent and Trademark Office*